United States Patent
Jia

(10) Patent No.: US 11,083,173 B2
(45) Date of Patent: Aug. 10, 2021

(54) METHOD AND DEVICE FOR ALERT PROCESSING IN PET PULLING PIECE

(71) Applicant: SHENZHEN SMART PET TECHNOLOGY CO., LTD, Shenzhen (CN)

(72) Inventor: Yaya Jia, Shenzhen (CN)

(73) Assignee: SHENZHEN SMART PET TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/170,934

(22) Filed: Feb. 9, 2021

(65) Prior Publication Data
US 2021/0185986 A1    Jun. 24, 2021

Related U.S. Application Data

(63) Continuation of application No. PCT/CN2020/108094, filed on Aug. 10, 2020.

(30) Foreign Application Priority Data

Dec. 23, 2019    (CN) .......................... 201911341233.7

(51) Int. Cl.
*A01K 27/00*    (2006.01)
(52) U.S. Cl.
CPC .......... *A01K 27/003* (2013.01); *A01K 27/006* (2013.01); *A01K 27/009* (2013.01)
(58) Field of Classification Search
CPC .. A01K 27/004; A01K 27/003; A01K 27/002; A01K 27/005; A01K 27/00; A01K 27/001; A01K 25/00; A01K 27/009; A01K 1/04; A01K 27/006; A01K 15/021; A01K 15/02; A01K 15/029; A01K 15/04; A01K 1/0263; A01K 1/0613; A01K 97/00
USPC ........ 119/796, 797, 792, 795, 859, 794, 863
See application file for complete search history.

(56) References Cited

U.S. PATENT DOCUMENTS

| | | | |
|---|---|---|---|
| 10,602,722 B1 * | 3/2020 | Hetzer ................. | A01K 27/001 |
| 2003/0150402 A1 * | 8/2003 | Muller ................. | A01K 27/001 |
| | | | 119/856 |
| 2010/0050955 A1 * | 3/2010 | Pacheco ............... | A01K 15/021 |
| | | | 119/719 |
| 2013/0176125 A1 * | 7/2013 | Beck ...................... | G16H 40/67 |
| | | | 340/573.1 |
| 2015/0359197 A1 * | 12/2015 | Crucs ................... | A01K 27/009 |
| | | | 119/719 |

(Continued)

*Primary Examiner* — Yvonne R Abbott-Lewis

(57) ABSTRACT

The present disclosure provides an alert method and device in a pet pulling piece, which comprises: when the tension data value of the pet pulling leash is at a security level, enabling a security level alert mode including indicator light alert in which the indicator light emits in green; when the tension data value of the pet pulling leash is at an alarm level, enabling an alarm alert mode including a combination of indicator light, vibration, and sound in which the indicator light emits in yellow, the sound is soft, and the vibration is moderate; and when the tension data value of the pet pulling leash is at a danger level, enabling a danger alert mode including a combination of indicator light, vibration, and sound in which the indicator light emits in red, the sound is urgent, and the vibration is intense, while sending an ultrasound alarm to the pet.

3 Claims, 2 Drawing Sheets

(56) References Cited

U.S. PATENT DOCUMENTS

| | | | |
|---|---|---|---|
| 2015/0373951 A1* | 12/2015 | Kelly | A01K 27/009 119/719 |
| 2019/0029225 A1* | 1/2019 | Dugan | A01K 27/003 |
| 2019/0230904 A1* | 8/2019 | Sundance | A01K 27/005 |

* cited by examiner

METHOD AND DEVICE FOR ALERT PROCESSING IN PET PULLING PIECE

TECHNICAL FIELD

The present disclosure relates to the field of pet products, and more particularly, to a method and device for alert processing in a pet pulling piece.

BACKGROUND

Recently, with improvements in life standards, keeping bets, such as dogs, has become an important part of human life, and pet products have become increasingly abundant, among which pet pulling pieces have even become a fashion item. Pet pulling pieces are a must-have item for dog keeping, whether for pet training or for bringing pets along for walking outdoors.

Existing pet pulling devices include a pet pulling handle and a pet pulling leash connected thereto. However, existing pet pulling pieces merely have a single function, i.e., the simple function of pulling. However, while walking along with a pet, the pet frequently moves and runs around. Especially the pet may suddenly run about to the surprise of the human, in which case he/she may be caused to fall over. When the human is an aged man/woman or a child, he/she may fall over and get hurt.

Therefore, it is necessary to provide a solution to prevent the human from falling over out of surprise and getting hurt when walking along with a pet due to pet moving and running around or sudden running.

SUMMARY

Embodiments of the present disclosure aim to address the technical problem of providing a method and device for alert processing in a pet pulling piece capable of alerting a human in time which can effectively prevent the human from falling over out of surprise and getting hurt when walking along with a pet due to pet moving and running around or sudden running.

In a first aspect, the present application provides a method for alert processing in a pet pulling piece including a pulling handle and a pet pulling leash connected thereto, the method including:

detecting a tension data value of the pet pulling leash;

determining whether the tension data value of the pet pulling leash is less than a first preset threshold;

when the tension data value of the pet pulling leash is less than the first preset threshold, determining that the current tension data value of the pet pulling leash is at a security level, and enabling a security level alert mode corresponding to the security level, the security level alert mode including indicator light alert in which the indicator light emits in green;

when the tension data value of the pet pulling leash is greater than the first preset threshold and less than a second preset threshold, determining that the current tension data value of the pet pulling leash is at an alarm level, and enabling an alarm alert mode corresponding to the alarm level, the alarm alert mode being an alert mode including a combination of indicator light, vibration, and sound in which the indicator light emits in yellow, the sound is soft, and the vibration is moderate; and when the tension data value of the pet pulling leash is greater than the second preset threshold, determining that the current tension data value of the pet pulling leash is at a danger level, enabling a danger alert mode corresponding to the danger level and sending an ultrasound alarm to the pet, the danger alert mode being an alert mode including a combination of indicator light, vibration, and sound in which the indicator light emits in red, the sound is urgent, and the vibration is intense.

In an optional design, the method further includes, prior to the step of detecting a tension data value of the pet pulling leash:

presetting a first threshold for the tension data value of the pet pulling leash, a second threshold for the tension data value of the pet pulling leash, and a third threshold for the tension data value of the pet pulling leash, the second threshold being greater than the first threshold.

In an optional design, the method further includes, subsequent to the step of detecting a tension data value of the pet pulling leash:

displaying the tension data value of the pet pulling leash on a display screen provided on the pulling handle.

In an optional design, the step of detecting a tension data value of the pet pulling leash specifically includes:

detecting the tension data value of the pet pulling leash by a tension sensor.

In a second aspect, the present application provides a device for alert processing in a pet pulling piece, including a pet-pulling-leash tension detection module, a pet-pulling-leash tension detected characteristic analysis module, a processing module, and a human alert module and a pet deterring module in which the pet-pulling-leash tension detection module is configured to detect the tension data value of the pet pulling leash;

the pet-pulling-leash tension detected characteristic analysis module is configured to analyze the tension data value of the pet pulling leash detected by the pet-pulling-leash tension detection module to determine whether the tension data value of the pet pulling leash is less than a first preset threshold; when the tension data value of the pet pulling leash is greater than the first preset threshold, further determine through analysis whether the tension data value of the pet pulling leash is less than a second preset threshold; and when the tension data value of the pet pulling leash is greater than the first preset threshold and less than the second preset threshold, further determine through analysis whether the tension data value of the pet pulling leash is greater than the second preset threshold;

the processing module is configured to, when it is determined, by the pet-pulling-leash tension detected characteristic analysis module, that the current tension data value of the pet pulling leash is less than the first preset threshold, then determine that the current tension data value of the pet pulling leash is at a security level, enable a security level alert mode corresponding to the security level, and present an indicator light alert by the human alert module in a security level alert mode in which the indicator light emits in green; when the tension data value of the pet pulling leash is greater than the first preset threshold and less than a second preset threshold, then determine that the current tension data value of the pet pulling leash is at an alarm level, enable an alarm alert mode corresponding to the alarm level, and present an alert mode including a combination of indicator light, vibration, and sound by the human alert module in an alarm alert mode in which the indicator light emits in yellow, the sound is soft, and the vibration is moderate; and when the tension data value of the pet pulling leash is greater than the second preset threshold, then determine that the current tension data value of the pet pulling leash is at a danger level, enable a danger level alert mode corresponding to the danger level, and present an alert mode including a combination of indicator light, vibration, and sound by the human alert module in a danger alert mode in which the indicator light emits in red, the sound is urgent, and the vibration is intense, while sending an ultrasound alarm to the pet by the pet deterring module.

The human alert module is configured to present a corresponding alert to the human.

The pet deterring module is configured to send an ultrasound alarm to the pet.

In an optional design, the device further includes:

a presetting module configured to preset the first threshold for the tension data value of the pet pulling leash and the second threshold for the tension data value of the pet pulling leash, the second threshold being greater than the first threshold.

In an optional design, the pet-pulling-leash tension detection module is a tension sensor configured to detect the tension data value of the pet pulling leash.

The present disclosure has the following beneficial effects. The present disclosure provides an alert method and device in a pet pulling piece. In this method, the tension data value of the pet pulling leash is determined through detection and analysis. When the tension data value of the pet pulling leash is less than a first preset threshold, it is determined that the current tension data value of the pet pulling leash is at a security level, and a security level alert mode corresponding to the security level is enabled. The security level alert mode includes indicator light alert in which the indicator light emits in green. When the tension data value of the pet pulling leash is greater than the first preset threshold and less than a second preset threshold, it is determined that the current tension data value of the pet pulling leash is at an alarm level and an alarm alert mode corresponding to the alarm level is enabled. The alarm alert mode is an alert mode including a combination of indicator light, vibration, and sound, in which the indicator light emits in yellow, the sound is soft, and the vibration is moderate. When the tension data value of the pet pulling leash is greater than the second preset threshold, it is determined that the current tension data value of the pet pulling leash is at a danger level and a danger alert mode corresponding to the danger level is enabled while an ultrasound alarm is sent to the pet. The danger alert mode is an alert mode including a combination of indicator light, vibration and sound, in which the indicator light emits in red, the sound is urgent, and the vibration is intense. In this way, depending on the different levels of the detected tension data value of the pet pulling leash, different human alert modes are enabled accordingly. As the level increases, the intensity of alert to human increases gradually. Meanwhile, the pet can be deterred. As such, it is possible to alert the human in time, thereby preventing the human from falling over out of surprise and getting hurt when walking along with a pet due to pet moving and running around or sudden running.

BRIEF DESCRIPTION OF THE DRAWINGS

In order to explain the technical solutions in the embodiments of the present disclosure or the background art more clearly, the following description will be provided of the drawings needed in the embodiments of the present disclosure or the background art.

DESCRIPTION OF THE EMBODIMENTS

Embodiments of the present disclosure will be described below with reference to the drawings in the embodiments of the present disclosure.

In order to make the purpose, technical solution and advantages of the present application more apparent, the embodiments of the present application will be further described in detail with reference to the drawings.

When the following description refers to the drawings, unless otherwise indicated, the same numbers in different drawings refer to the same or similar elements. The implementations described in the following exemplary embodiments do not represent all implementations consistent with the present application. Rather, they are merely examples of the device and method consistent with some aspects of the present application as detailed in the appended claims.

In the description of the present application, it should be understood that the terms "first", "second", etc. are intended merely for descriptive purposes and shall not be understood as indicating or implying relative importance. For those of ordinary skill in the art, the specific meanings of the above terms in the present application can be understood in specific situations. In addition, in the description of the present application, unless otherwise specified, the expression "a plurality of" means two or more, the expression "and/or", which describes the relationship between related objects, means that there can be three types of relationships, for example, A and/or B, which can mean three situations: A alone exists, both A and B exist, and B alone exists. The character "/" generally indicates the relationship of "or" between the related objects.

Figure 1:
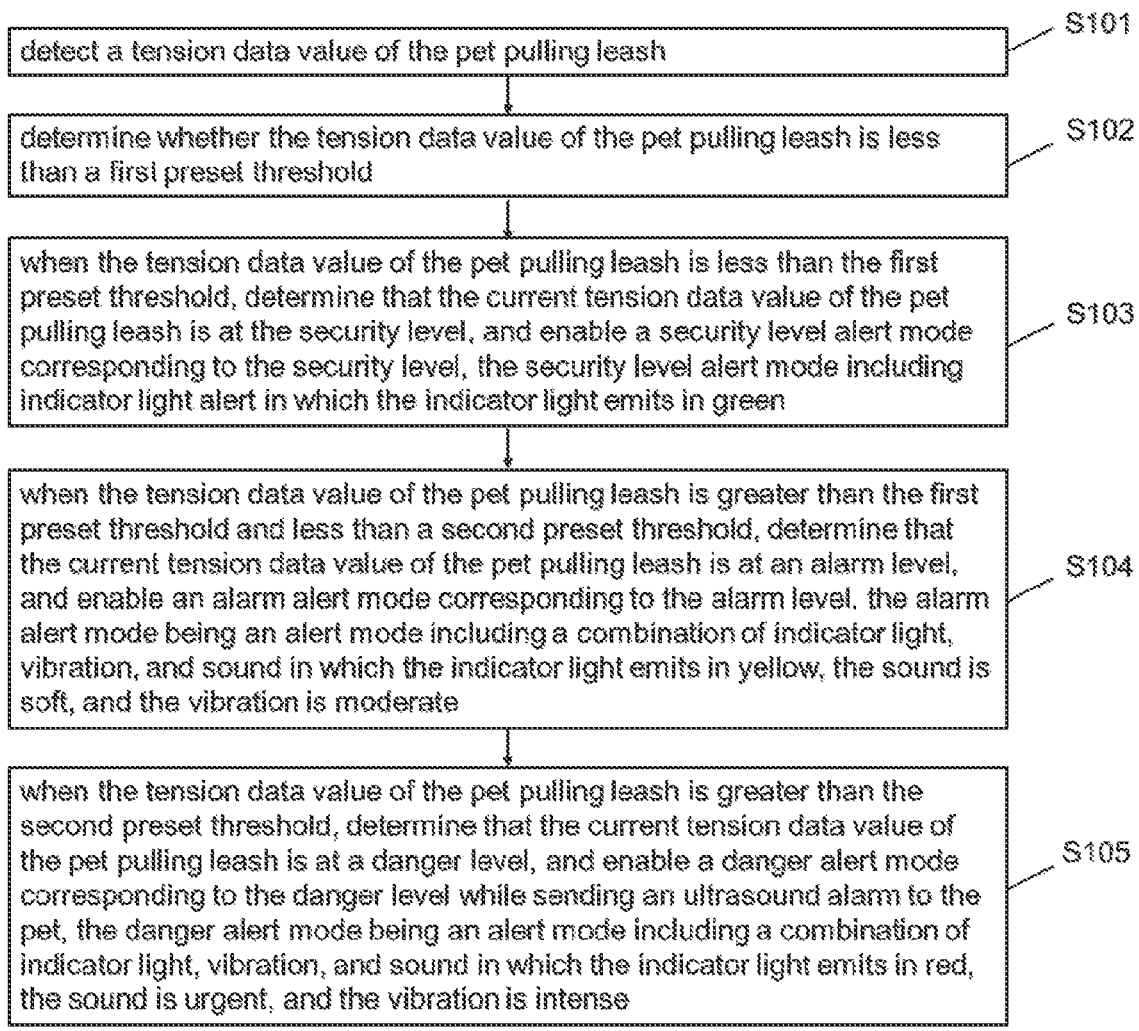
FIG. 1 is a schematic flow diagram of a method for alert processing in a pet pulling piece according to an embodiment of the present disclosure.

Refer to FIG. 1, which is a schematic flow diagram of a method for alert processing in a pet pulling piece according to an embodiment of the present disclosure. This method includes, without limitation, the following steps.

S101: detecting a tension data value of the pet pulling leash.

In an optional design, the step of detecting a tension data value of the pet pulling leash includes specifically: detecting the tension data value of the pet pulling leash by a tension sensor.

In an optional design, the method further includes, prior to the step of detecting a tension data value of the pet pulling leash:

presetting a first threshold for the tension data value of the pet pulling leash and a second threshold for the tension data value of the pet pulling leash, the second threshold being greater than the first threshold.

It is noted that in this embodiment, the first preset threshold for the tension data value of the pet pulling leash and the second preset threshold for the tension data value of the pet pulling leash are not always fixed, but are set by the user him/herself. The user may set these thresholds depending on the condition of the human. For example, if the human is a child or an aged man/woman, who is relatively weak physically and may easily fall over and get hurt due to pet moving around, running around, or sudden running, then the first preset threshold for the tension data value of the pet pulling leash and the second preset threshold for the tension data value of the pet pulling leash can be set depending on the actual condition of the child or aged man/woman. Also, for example, if the human is a young man/woman, who is relatively strong physically and may not easily fall over and get hurt due to pet moving around, running around, or sudden running, then the first preset threshold for the tension data value of the pet pulling leash and the second preset threshold for the tension data value of the pet pulling leash can be preset higher than those for a child or aged man/woman.

It is noted that, in this embodiment, the pet pulling piece includes a pet pulling handle and a pet pulling leash connected thereto. The tension sensor is built in the pet pulling handle for detecting the tension data value of the pet pulling leash.

In an optional design, the method further includes, subsequent to the step of detecting a tension data value of the pet pulling leash:

displaying the tension data value of the pet pulling leash on a display screen provided on the pulling handle.

In this embodiment, the display screen provided on the pet pulling handle is configured for human-machine interaction and may be a liquid crystal display screen etc. that can display the current tension data value of the pet pulling leash.

S102: determining whether the tension data value of the pet pulling leash is less than a first preset threshold.

In this embodiment, the tension data value of the pet pulling leash detected by the tension sensor is compared with the first preset threshold for the tension data value of the pet pulling leash and the second preset threshold for the tension data value of the pet pulling leash to determine whether the current tension data value of the pet pulling leash is at a security level, an alarm level, or a danger level, and a corresponding human alert mode is enabled depending on different levels.

S103: when the tension data value of the pet pulling leash is less than the first preset threshold, determining that the current tension data value of the pet pulling leash is at the security level, and enabling a security level alert mode corresponding to the security level, the security level alert mode including indicator light alert in which the indicator light emits in green.

Specifically, when the current tension data value of the pet pulling leash is at the security level, the alert function is the weakest, including only indicator light alert in which the indicator light emits in green, indicating that the pet is in a normal state without starting moving or running around.

S104: when the tension data value of the pet pulling leash is greater than the first preset threshold and less than a second preset threshold, determining that the current tension data value of the pet pulling leash is at an alarm level, and enabling an alarm alert mode corresponding to the alarm level, the alarm alert mode being an alert mode including a combination of indicator light, vibration, and sound in which the indicator light emits in yellow, the sound is soft, and the vibration is moderate.

Specifically, when the current tension data value of the pet pulling leash is at the alarm level, the alert function is stronger than the one for the security level, where the alert mode has been enhanced to one including a combination of indicator light, vibration, and sound, in which the indicator light emits in yellow, the sound is soft, and the vibration is moderate, indicating that the pet is in the relatively severe state of moving or running around, possibly causing the human to fall over out surprise and get hurt. Therefore, the alert mode including a combination of indicator light, vibration, and sound is employed to provide increased intensity and means of alert to human.

S105: when the tension data value of the pet pulling leash is greater than the second preset threshold, determining that the current tension data value of the pet pulling leash is at a danger level, and enabling a danger alert mode corresponding to the danger level while sending an ultrasound alarm to the pet, the danger alert mode being an alert mode including a combination of indicator light, vibration, and sound in which the indicator light emits in red, the sound is urgent, and the vibration is intense.

Specifically, when the current tension data value of the pet pulling leash is at the danger level, the alert function is stronger than the one for the alarm level, where the alert mode has been enhanced to one including a combination of indicator light, vibration, and sound in which the indicator light emits in red, the sound is urgent, and the vibration is intense, indicating that the pet is in the severe state of moving or running around, very likely to cause the human to fall over out of surprise and get hurt. Therefore, the alert mode including a combination of indicator light, vibration, and sound is employed, in which the indicator light emits in red, the sound is urgent, and the vibration is intense, to provide increased intensity of alert to human, while sending an ultrasound alarm to the pet.

It is noted that, in this embodiment, the security level alert mode corresponding to the security level includes indicator light alert in which the indicator light emits in green, but the present disclosure is not limited to alert in this manner, and the alert may be made in other manners, which is not to be limited by the present disclosure.

The alarm alert mode corresponding to the alarm level is an alert mode including a combination of indicator light, vibration, and sound, in which the indicator light emits in yellow, the sound is soft, and the vibration is moderate, but the present disclosure is not limited to alert in this manner, and the alert may be made in other manners, which is not to be limited by the present disclosure. The danger alert mode corresponding to the danger level is an alert mode including a combination of indicator light, vibration, and sound, in which the indicator light emits in red, the sound is urgent, and the vibration is intense, but the present disclosure is not limited to alert in this manner, and the alert may be made in other manners, which is not to be limited by the present disclosure.

The present disclosure has the following beneficial effects. In the alert method in a pet pulling leash provided by the present disclosure, the tension data value of the pet pulling leash is determined through detection and analysis. When the tension data value of the pet pulling leash is less than the first preset threshold, it is determined that the current tension data value of the pet pulling leash is at the security level, and the security level alert mode corresponding to the security level is enabled. The security level alert mode includes indicator light alert in which the indicator light emits in green. When the tension data value of the pet pulling leash is greater than the first preset threshold and less than the second preset threshold, it is determined that the current tension data value of the pet pulling leash is at the alarm level and the alarm alert mode corresponding to the alarm level is enabled. The alarm alert mode is an alert mode including a combination of indicator light, vibration, and sound, in which the indicator light emits in yellow, the sound is soft, and the vibration is moderate. When the tension data value of the pet pulling leash is greater than the second preset threshold, it is determined that the current tension data value of the pet pulling leash is at the danger level, and the danger alert mode corresponding to the danger level is enabled while an ultrasound alarm is sent to the pet. The danger alert mode is an alert mode including a combination of indicator light, vibration and sound, in which the indicator light emits in red, the sound is urgent, and the vibration is intense. In this way, depending on the different levels of the detected tension data value of the pet pulling leash, different human alert modes are enabled accordingly. As the level increases, the intensity of alert to human increases gradually. Meanwhile, the pet can be deterred. As such, it is possible to alert the human in time, thereby preventing the human from falling over out of surprise and getting hurt when walking along with a pet due to pet moving and running around or sudden running.

The method according to an embodiment of the present disclosure has been described above in detail, and the device according to an embodiment of the present disclosure is to be described below.

Figure 2:
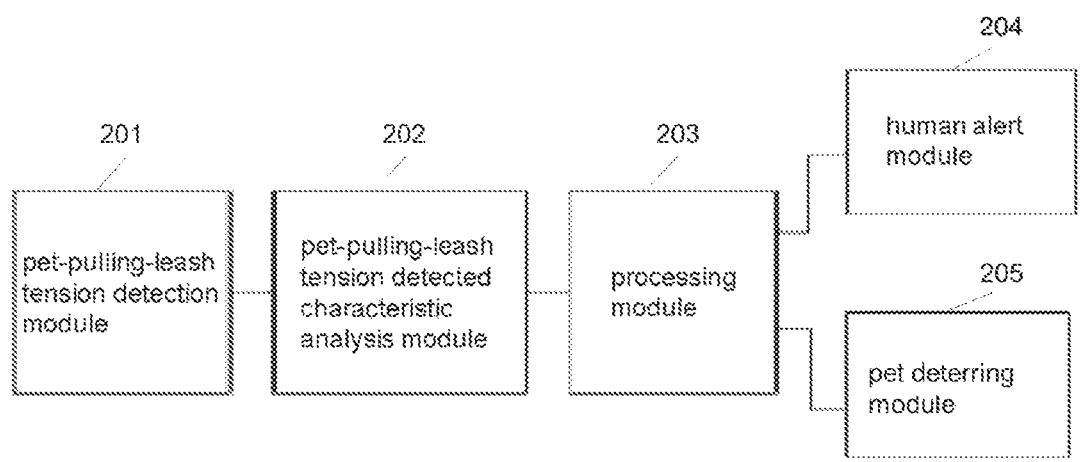
FIG. 2 is a schematic structural view of a device for alert processing in a pet pulling piece according to an embodiment of the present disclosure.

Refer to FIG. 2, which is a schematic structural view of a device for alert processing in a pet pulling piece according to an embodiment of the present disclosure, referred to briefly as a processing device 2 below. The processing device 2 includes a pet-pulling-leash tension detection module 201, a pet-pulling-leash tension detected characteristic analysis module 202, a processing module 203, a human alert module 204, and a pet deterring module 205. The various units shall be described in detail below.

The pet-pulling-leash tension detection module 201 is configured to detect the tension data value of the pet pulling leash.

The pet-pulling-leash tension detected characteristic analysis module 202 is configured to analyze the tension data value of the pet pulling leash detected by the pet-pulling-leash tension detection module 201 to determine whether the tension data value of the pet pulling leash is less than a first preset threshold; when the tension data value of the pet pulling leash is greater than the first preset threshold, further determine through analysis whether the tension data value of the pet pulling leash is less than a second preset threshold; and when the tension data value of the pet pulling leash is greater than the first preset threshold and less than the second preset threshold, further determine through analysis whether the tension data value of the pet pulling leash is greater than the second preset threshold.

The processing module 203 is configured to, when it is determined, by the pet-pulling-leash tension detected characteristic analysis module 202, that the current tension data value of the pet pulling leash is less than the first preset threshold, then determine that the current tension data value of the pet pulling leash is at a security level, enable a security level alert mode corresponding to the security level, and present an indicator light alert by the human alert module in the security level alert mode in which the indicator light emits in green; when the tension data value of the pet pulling leash is greater than the first preset threshold and less than the second preset threshold, determine that the current tension data value of the pet pulling leash is at an alarm level, enable an alarm alert mode corresponding to the alarm level, and present an alert mode including a combination of indicator light, vibration, and sound by the human alert module in the alarm alert mode in which the indicator light emits in yellow, the sound is soft, and the vibration is moderate; when the tension data value of the pet pulling leash is greater than the second preset threshold, determine that the current tension data value of the pet pulling leash is at a danger level, enable a danger level alert mode corresponding to the danger level, and present an alert mode including a combination of indicator light, vibration, and sound by the human alert module in the danger alert mode in which the indicator light emits in red, the sound is urgent, and the vibration is intense, while sending an ultrasound alarm to the pet by the pet deterring module.

The human alert module 204 is configured to present a corresponding alert to the user, specifically to: when the current tension data value of the pet pulling leash is at the security level, enable the security level alert mode corresponding to the security level, the security level alert mode including indicator light alert in which the indicator light emits in green; when the tension data value of the pet pulling leash is greater than the first preset threshold and less than the second preset threshold, determine that the current tension data value of the pet pulling leash is at the alarm level, enable the alarm alert mode corresponding to the alarm level, the alarm alert mode being an alert mode including a combination of indicator light, vibration, and sound in which the indicator light emits in yellow, the sound is soft, and the vibration is moderate; when the tension data value of the pet pulling leash is greater than the second preset threshold, determine that the current tension data value of the pet pulling leash is at the danger level, and enable the danger level alert mode corresponding to the danger level while sending an ultrasound alarm to the pet, the danger level alert mode being an alert mode including a combination of indicator light, vibration, and sound in which the indicator light emits in red, the sound is urgent, and the vibration is intense.

The pet deterring module 205 is configured to send an ultrasound alarm to the pet.

It is noted that, the device according to an embodiment of the present disclosure further includes a presetting module configured to preset a first threshold for the tension data value of the pet pulling leash and a second threshold for the tension data value of the pet pulling leash.

In an optional design, the pet-pulling-leash tension detection module 201 is a tension sensor configured to detect the tension data value of the pet pulling leash.

The present disclosure has the following beneficial effects. In the device for alert processing in a pet pulling leash provided by the present disclosure, the pet-pulling-leash tension detection module 201 detects the tension data value of the pet pulling leash. The pet-pulling-leash tension detected characteristic analysis module 202 analyzes the tension data value of the pet pulling leash detected by the pet-pulling-leash tension detection module 201 to determine whether the tension data value of the pet pulling leash is less than the first preset threshold; when the tension data value of the pet pulling leash is greater than the first preset threshold, further determines through analysis whether the tension data value of the pet pulling leash is less than the second preset threshold; and when the tension data value of the pet pulling leash is greater than the first preset threshold and less than the second preset threshold, further determines through analysis whether the tension data value of the pet pulling leash is greater than the second preset threshold. The processing module 203 is configured to: when it is determined, by the pet-pulling-leash tension detected characteristic analysis module 202, that the tension data value of the pet pulling leash is less than the first preset threshold, determine that the current tension data value of the pet pulling leash is at the security level, enable the security level alert mode corresponding to the security level, and present an indicator light alert by the human alert module in the security level alert mode in which the indicator light emits in green; when the tension data value of the pet pulling leash is greater than the first preset threshold and less than the second preset threshold, determine that the current tension data value of the pet pulling leash is at the alarm level, enable the alarm alert mode corresponding to the alarm level, and present an alert mode including a combination of indicator light, vibration, and sound by the human alert module in the alarm alert mode in which the indicator light emits in yellow, the sound is soft, and the vibration is moderate; when the tension data value of the pet pulling leash is greater than the second preset threshold, determine that the current tension data value of the pet pulling leash is at the danger level, enable the danger level alert mode corresponding to the danger level, and present an alert mode including a combination of indicator light, vibration, and sound by the human alert module in the danger alert mode in which the indicator light emits in red, the sound is urgent, and the vibration is intense, while sending an ultrasound alarm to the pet by the pet deterring module. The human alert module 204 is configured to present a corresponding alert to the human, and the pet deterring module 205 is configured to send an ultrasound alarm to the pet. In this way, depending on the different levels of the detected tension data value of the pet pulling leash, different human alert modes are enabled accordingly. As this level increases, the intensity of alert to human increases gradually. Meanwhile, the pet can be deterred. As such, it is possible to alert the human in time, thereby preventing the human from falling over out of surprise and getting hurt when walking along with a pet due to pet moving and running around or sudden running.

This embodiment of the present disclosure is based on the same concept as the method embodiment of FIG. 1 and provides the same technical effects. For the specific process, reference may be made to the description of the method embodiment in FIG. 1, and the specific process will not be described again herein.

The processing module of the present disclosure can also be a field-programmable gate array (FPGA), an application specific integrated chip, a system on chip (SoC), a central processor unit (CPU), a network processor (NP), a digital signal processing circuit, a micro controller unit (MCU), and a programmable logic device (PLD) or other integrated chips that provide relevant functions.

Those of ordinary skill in the art can realize that the units and algorithm steps in each example described in connection with the embodiments disclosed herein can be implemented in electronic hardware, or a combination of computer software and electronic hardware. Whether these functions are implemented in hardware or software depends on the specific application and design constraints of the technical solution. Skilled artisans can use different methods to implement the described functions for each specific application, but such implementation should not be considered as departure from the scope of the present application.

It can be clearly understood by those skilled in the art that for the convenience and conciseness of description, the specific operating processes of the systems, devices and units described above shall not be described in detail again herein, and reference may be made to the corresponding processes in the aforementioned method embodiments.

It should be understood that, in several embodiments provided in the present application, the disclosed system, device and method can be implemented in other ways. For example, the device embodiment described above is merely illustrative. For example, the units are divided merely based on their logical functions. In practical implementation, they may be divided in other manners. For example, multiple units or components can be combined or integrated into another system, or some features can be omitted or not implemented. On the other hand, the mutual coupling or direct coupling or communication connection shown or discussed may alternatively be indirect coupling or communication connection through some interfaces, and the indirect coupling or communication connection between the devices or units may be electrical, mechanical or otherwise.

The units described as separated components may be or may not be physically separated, and the components displayed as units may be or may not be physical units, that is, they may be located in one place or distributed to multiple network units. Some or all of the units can be selected according to actual needs to achieve the purpose of this implementation.

In addition, individual functional units in embodiments of the present application may be integrated into one processing unit, or individual units may physically exist separately, or two or more units may be integrated into one unit.

In the above embodiments, the present disclosure can be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the flow or function according to the embodiment of the present disclosure is generated in whole or in part. The computer can be a general purpose computer, a special purpose computer, a computer network, or other programmable devices. The computer instructions may be stored in a computer-readable storage medium or transmitted through the computer-readable storage medium. The computer instructions can be transmitted from one website, computer, server or data center to another in a wired (such as coaxial cable, optical fiber, digital subscriber line (DSL)) or wireless (such as infrared, wireless, microwave, etc.) manner. The computer-readable storage medium can be any available medium that can be accessed by a computer, or data storage devices such as servers and data centers that contain one or more integrated available media. The available media can be magnetic media (e.g., floppy disk, hard disk, magnetic tape), optical media (e.g., DVD), or semiconductor media (e.g., Solid State Disk (SSD)) or the like.

Those of ordinary skill in the art can understand the implementation of all or part of the flow in the method of the above embodiments, which can be completed by related hardware as instructed by computer programs, which can be stored in computer-readable storage media, and which, when executed, can include the flow of the above method embodiments. The aforementioned storage media include ROM or Random Access Memory (RAM), magnetic disk or optical disk, and other media which can store program codes.

What is claimed is:

1. A method for alert processing in a pet pulling piece including a pulling handle and a pet pulling leash connected thereto, the method comprising:
   detecting a tension data value of the pet pulling leash;
   determining whether the tension data value of the pet pulling leash is less than a first preset threshold;
   when the tension data value of the pet pulling leash is less than the first preset threshold, determining that the current tension data value of the pet pulling leash is at a security level, and enabling a security level alert mode corresponding to the security level, wherein the security level alert mode includes indicator light alert in which the indicator light emits in green;
   when the tension data value of the pet pulling leash is greater than the first preset threshold and less than a second preset threshold, determining that the current tension data value of the pet pulling leash is at an alarm level, and enabling an alarm alert mode corresponding to the alarm level, wherein the alarm alert mode is an alert mode including a combination of indicator light, vibration, and sound in which the indicator light emits in yellow, the sound is soft, and the vibration is moderate; and when the tension data value of the pet pulling leash is greater than the second preset threshold, determining that the current tension data value of the pet pulling leash is at a danger level, enabling a danger alert mode corresponding to the danger level while sending an ultrasound alarm to the pet, wherein the danger alert mode is an alert mode including a combination of indicator light, vibration, and sound in which the indicator light emits in red, the sound is urgent, and the vibration is intense;

wherein the method for alert processing in a pet pulling piece further comprising, subsequent to the step of detecting a tension data value of the pet pulling leash:

displaying the tension data value of the pet pulling leash on a display screen provided on the pulling handle.

2. The method for alert processing in a pet pulling piece of claim 1, further comprising, prior to the step of detecting a tension data value of the pet pulling leash:

presetting a first threshold for the tension data value of the pet pulling leash, a second threshold for the tension data value of the pet pulling leash, and a third threshold for the tension data value of the pet pulling leash, the second threshold being greater than the first threshold.

3. The method for alert processing in a pet pulling piece of claim 1, wherein the step of detecting a tension data value of the pet pulling leash specifically comprises:

detecting the tension data value of the pet pulling leash by a tension sensor.

* * * * *